US010766527B2

(12) United States Patent
Dreyer

(10) Patent No.: US 10,766,527 B2
(45) Date of Patent: Sep. 8, 2020

(54) STEERING ANGLE CONTROLLER

(71) Applicant: VOLKSWAGEN AKTIENGESELLSCHAFT, Wolfsburg (DE)

(72) Inventor: Dirk Dreyer, Stadthagen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/058,485

(22) Filed: Aug. 8, 2018

(65) Prior Publication Data
US 2019/0054953 A1 Feb. 21, 2019

(30) Foreign Application Priority Data

Aug. 18, 2017 (DE) .................. 10 2017 214 380

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G05F 7/00* | (2006.01) |
| *G06F 17/00* | (2019.01) |
| *G06F 19/00* | (2018.01) |
| *B62D 6/08* | (2006.01) |

(52) U.S. Cl.
CPC .............. *B62D 6/08* (2013.01); *B62D 6/002* (2013.01); *B62D 6/007* (2013.01)

(58) Field of Classification Search
CPC ........... B62D 6/002; B62D 6/007; B62D 6/08
See application file for complete search history.

(56) References Cited

U.S. PATENT DOCUMENTS

| | | | | |
|---|---|---|---|---|
| 4,695,068 A | * | 9/1987 | Kawamoto | .......... B62D 7/1545 180/409 |
| 5,379,220 A | * | 1/1995 | Allen | ..................... B62D 7/142 180/415 |
| 9,365,218 B2 | | 6/2016 | Pallett et al. | |

(Continued)

FOREIGN PATENT DOCUMENTS

| | | |
|---|---|---|
| DE | 19703846 A1 | 8/1998 |
| DE | 102004026147 A1 | 2/2005 |

(Continued)

OTHER PUBLICATIONS

Search Report for German Patent Application No. 10 2017 214 380.0; Mar. 23, 2018.

*Primary Examiner* — Harry Y Oh
(74) *Attorney, Agent, or Firm* — Barnes & Thornburg LLP

(57) ABSTRACT

A steering angle controller which controls an actual value to a desired value, wherein the steering angle controller outputs, as an output signal, an actuating signal for power electronics to control an electric servo motor, wherein the actual value is a steering angle or a measurement variable corresponding to the steering angle and the desired value is a steering angle request or measurement variable request, wherein the steering angle controller is assigned at least one memory which stores at least two different control algorithms.

12 Claims, 1 Drawing Sheet

(56) References Cited

U.S. PATENT DOCUMENTS

| | | | |
|---|---|---|---|
| 2008/0114511 A1* | 5/2008 | Sakugawa | B60T 8/1755 |
| | | | 701/41 |
| 2008/0161999 A1 | 7/2008 | Davis et al. | |
| 2010/0211269 A1* | 8/2010 | Yasutake | B60T 8/1755 |
| | | | 701/42 |
| 2016/0046321 A1* | 2/2016 | Takashima | B62D 6/002 |
| | | | 701/41 |
| 2017/0174258 A1* | 6/2017 | Yamada | B62D 1/286 |
| 2018/0257698 A1* | 9/2018 | Ryne | B62D 5/0457 |
| 2019/0084613 A1* | 3/2019 | Tsubaki | B62D 6/00 |

FOREIGN PATENT DOCUMENTS

| | | |
|---|---|---|
| DE | 102005056211 A1 | 6/2007 |
| DE | 102006023562 A1 | 11/2007 |
| DE | 60319497 T2 | 3/2009 |
| DE | 102010048958 A1 | 4/2012 |
| DE | 102015110903 A1 | 1/2016 |
| DE | 102014219936 A1 | 4/2016 |
| JP | 2748714 B2 | 10/1992 |
| JP | H04304502 | 10/1992 |

* cited by examiner

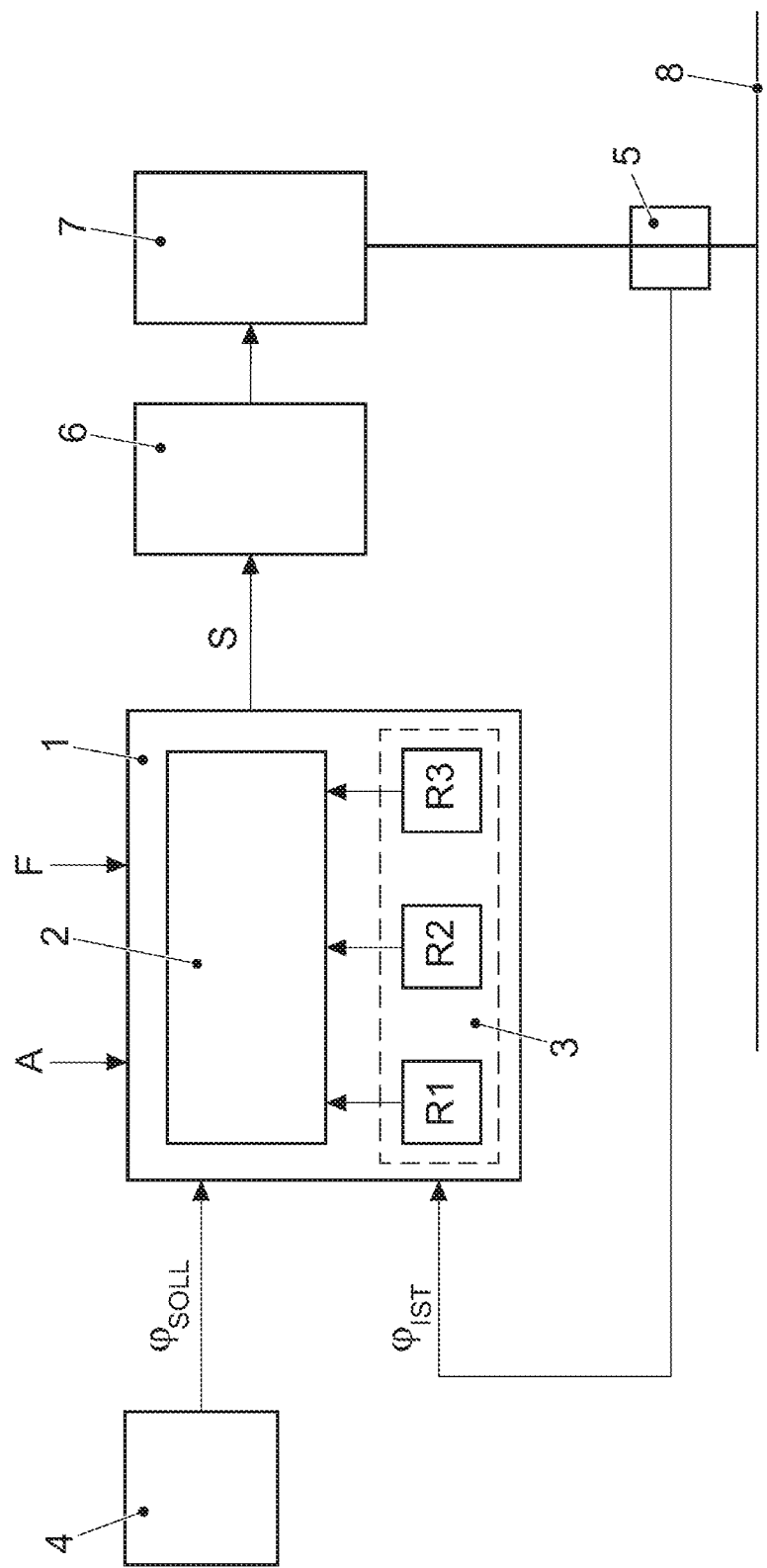

STEERING ANGLE CONTROLLER

PRIORITY CLAIM

This patent application claims priority to German Patent Application No. 10 2017 214 380.0, filed 18 Aug. 2017, the disclosure of which is incorporated herein by reference in its entirety.

SUMMARY

Illustrative embodiments relate to a steering angle controller.

BRIEF DESCRIPTION OF THE DRAWINGS

The disclosed embodiment is explained in more detail below, in which:

FIG. 1 shows a schematic block diagram of a steering angle controller.

DETAILED DESCRIPTION

Known steering systems having an electric servo motor capture a manual torque or a steering wheel rotational angle, for example, wherein an assistance torque which is intended to be applied by the servo motor is then calculated on the basis of the captured manual torque or steering wheel rotational angle.

In modern transportation vehicles in which a driver assistance system carries out a steering task completely or virtually completely, the driving assistance system specifies the trajectory which is then implemented by the steering angle controller. The steering angle controller then receives, as an input variable, a desired steering angle or a corresponding variable and tracks the actual steering angle in the best possible manner to minimize the control difference.

DE 10 2014 219 936 A1 discloses a trajectory planning method for determining a control profile for a transportation vehicle, in particular, an autonomously driving transportation vehicle, which has the following method operations of:
  providing a first position set and a second position set, wherein the first position set has at least one item of information relating to a starting condition at the start of a trajectory and the second position set has at least one item of information relating to an end condition at the end of a trajectory;
  providing a first and a second control set, wherein the first control set has at least one item of information relating to a first control state of the transportation vehicle at the start of the trajectory and the second control set has at least one item of information relating to a second control state of the transportation vehicle at the end of the trajectory;
  providing a transportation vehicle movement modeling function which has a kinematic movement model of the transportation vehicle;
  providing a solver;
  providing a control profile information set, which has two profile information values indicative of the trajectory, by applying the solver to the transportation vehicle movement modeling function on the basis of the first and second position sets and the first and second control sets, and
  determining a control profile for the transportation vehicle on the basis of the control profile information set.

In this case, an attempt is made to ensure that the trajectory to be moved along largely corresponds to a natural driving behavior.

Disclosed embodiments provide a steering angle controller which imparts an improved driving sensation.

The steering angle controller is designed to control an actual value to a desired value, wherein the steering angle controller outputs, as an output signal, an actuating signal for power electronics to control an electric servo motor, wherein the actual value is a steering angle or a measurement variable corresponding to the steering angle and the desired value is a steering angle request or measurement variable arrangement, wherein the steering angle controller is assigned a memory which stores at least two different control algorithms. This makes it possible to accordingly adapt the driving sensation. The control algorithm can be used to set, for example, how quickly the desired value is set and/or whether the desired value is set with or without overshooting.

In at least one disclosed embodiment, the steering angle controller is designed in such a manner that a control algorithm can be manually selected. The driver can therefore individually set the driving behavior of his transportation vehicle driving in an autonomous or assisted manner.

In another disclosed embodiment, the steering angle controller is designed in such a manner that a control algorithm is selected on the basis of at least one driving state variable. Such a driving state variable may be, for example, the speed, acceleration or else the load of the transportation vehicle. Furthermore, the control algorithm can be selected, for example, on the basis of a driving situation, for example, to situationally adapt the trajectory very quickly.

In another disclosed embodiment, at least one control algorithm reflects a sporty driving behavior and at least one control algorithm reflects a comfortable driving behavior. A yaw behavior of the transportation vehicle can therefore be influenced using the control algorithm, for example, thus producing a sporty or comfortable driving sensation.

In another disclosed embodiment, the corresponding measurement variable is a gear rack position.

In another disclosed embodiment, the steering angle controller is part of a transportation vehicle driving in an automated manner.

FIG. 1 illustrates a steering angle controller 1 which has a computing unit 2 and a memory unit 3, wherein the memory unit 3 stores various control algorithms R1-R3. In this case, the steering angle controller 1 receives a desired steering angle $\varphi$SOLL from a driver assistance system 4 and receives an actual steering angle $\varphi$IST from a sensor 5. The driver assistance system 4 is, for example, a trajectory planning system of an autonomously driving transportation vehicle and transmits the trajectory as desired steering angles $\varphi$SOLL to the steering angle controller 1. The computing unit 2 then uses a control algorithm R1-R3 to generate an actuating signal S for power electronics 6 which then control an electric motor 7 to minimize the control difference $\varphi$SOLL-$\varphi$IST by virtue of the electric motor 7 shifting a gear rack 8. The steering angle controller 1 is also designed to receive a selection signal A and to select one of the control algorithms R1-R3 on the basis of the selection signal A. The steering angle controller 1 is also designed to receive a driving state signal F and to select a control algorithm R1-R3 on the basis of the driving state signal F.

The user can then set a desired driving behavior using the selection signal A, or it is possible to situationally change over to a suitable control algorithm R1-R3 using the driving state signal F.

The invention claimed is:

1. A steering angle controller of a transportation vehicle that controls an actual steering angle value of the transportation vehicle based on a desired steering angle value, the controller comprising:

at least one memory that stores at least first and second control algorithms for controlling a steering angle adjustment behavior, wherein the first control algorithm causes the steering angle adjustment behavior to be a sporty driving behavior and the second control algorithm causes the steering angle adjustment behavior to be a comfortable driving behavior, wherein the steering angle controller is configured to, in response to receiving a signal indicating a manual selection of one of the first and second control algorithms when the transportation vehicle is operating autonomously, generate and output an output signal according to the selected one of the first and second control algorithms, wherein the output signal according to the selected one of the first and second control algorithms is an actuating signal for power electronics to control an electric servo motor according to the steering angle adjustment behavior associated with the selected one of the first and second control algorithms, and wherein the actual steering angle value is a steering angle or a measurement variable corresponding to the actual steering angle and the desired steering angle value is a steering angle request or measurement variable request.

2. The steering angle controller of claim 1, wherein the steering angle controller is configured to enable automatic selection of the control algorithm of the at least two different control algorithms based on at least one driving state variable of the transportation vehicle.

3. The steering angle controller of claim 1, wherein the corresponding measurement variable is a gear rack position of the transportation vehicle.

4. A method for controlling steering angle of a transportation vehicle using a steering angle controller, the method comprising:

controlling, by a processor of the steering angle controller, an actual steering angle value to approach a desired steering angle value, wherein the actual steering angle value is a steering angle or a measurement variable corresponding to the actual steering angle and the desired steering angle value is a steering angle request or measurement variable request, wherein controlling includes controlling, during a transition from the actual steering angle value to the desired steering angle value, a steering angle adjustment behavior to be according to one of a first control algorithm and a second control algorithm stored in a memory of the steering angle controller, wherein the first control algorithm causes the steering angle adjustment behavior to be a sporty driving behavior and the second control algorithm causes the steering angle adjustment behavior to be a comfortable driving behavior, and in response to receiving a signal indicating a manual selection of one of the first and second control algorithms when the transportation vehicle is operating autonomously, generating and outputting an output signal according to the selected one of the first and second control algorithms, wherein the output signal is an actuating signal for power electronics to control an electric servo motor according to the steering angle adjustment behavior associated with the selected one of the first and second control algorithms.

5. The method of claim 4, further comprising the steering angle controller automatically selecting a control algorithm of the at least two different control algorithms based on at least one driving state variable of the transportation vehicle.

6. The method of claim 4, wherein the corresponding measurement variable is a gear rack position of the transportation vehicle.

7. The steering angle controller of claim 1, wherein controlling the steering angle adjustment behavior includes setting how quickly the desired steering angle value is set and/or whether the desired steering angle value is set with or without overshooting.

8. The steering angle controller of claim 1, wherein the driving state signal includes speed, acceleration, or a load of the transportation vehicle.

9. The steering angle controller of claim 1, wherein the desired steering angle value is based on a trajectory to be moved along and corresponds to a natural driving behavior.

10. The method of claim 4, wherein controlling the steering angle adjustment behavior includes setting how quickly the desired steering angle value is set and/or whether the desired steering angle value is set with or without overshooting.

11. The method of claim 4, wherein the driving state includes speed, acceleration, or a load of the transportation vehicle.

12. The method of claim 4, wherein the desired steering angle value is based on a trajectory to be moved along and corresponds to a natural driving behavior.

* * * * *